United States Patent [19]

Dolan et al.

[11] Patent Number: 5,443,321
[45] Date of Patent: Aug. 22, 1995

[54] DISPENSING BRUSH HEAD

[76] Inventors: Michael J. Dolan, 5006 SW. 9th Way, Cooper City, Fla. 33328; William R. Dolan, 2101 N. 55th Ave., Hollywood, Fla. 33021

[21] Appl. No.: 369,691

[22] Filed: Jan. 6, 1995

[51] Int. Cl.⁶ .............................................. A46B 11/00
[52] U.S. Cl. .................................... 401/28; 132/112; 132/156; 401/272; 401/273
[58] Field of Search ......................... 401/28, 272, 273; 132/112, 116, 83, 156

[56] References Cited

U.S. PATENT DOCUMENTS

| | | |
|---|---|---|
| D. 165,109 | 11/1951 | Petrosky . |
| D 195,081 | 4/1963 | Anderson et al. . |
| D. 214,260 | 5/1969 | Yonkers . |
| D. 226,462 | 3/1973 | Gibbs . |
| D. 244,712 | 6/1977 | Houston . |
| D. 285,130 | 8/1986 | Wilkeson . |
| D. 285,131 | 8/1986 | Wilkeson . |
| D. 289,109 | 4/1987 | Buecheler et al. . |
| D. 298,585 | 11/1988 | Dolan et al. . |
| D. 308,476 | 6/1990 | Rosenberg . |
| D. 321,596 | 11/1991 | Zierhut . |
| D. 322,172 | 12/1991 | Cheng . |
| D. 323,431 | 1/1992 | de Mayo . |
| D. 324,777 | 3/1992 | Vangen . |
| D. 330,249 | 10/1992 | Mitchell . |
| D. 331,840 | 12/1992 | Garner . |
| D. 333,920 | 3/1993 | Vetter . |
| 621,917 | 3/1898 | Hippisley . |
| 969,292 | 9/1910 | Lawler ................................ 401/28 |
| 1,049,863 | 1/1913 | Happle et al. . |
| 1,639,586 | 8/1927 | Boucher ............................. 401/28 |
| 1,693,329 | 11/1928 | Astley ................................. 401/272 |
| 2,486,847 | 11/1949 | Hokett ................................ 401/273 |
| 2,584,735 | 2/1952 | Pancoast . |
| 2,626,617 | 1/1953 | Sullivan . |
| 2,932,840 | 4/1960 | Lathrop . |
| 4,044,724 | 8/1977 | Merchill . |
| 4,143,667 | 3/1979 | Peilet .................................... 401/28 |
| 4,254,738 | 3/1981 | Stanley . |
| 4,543,913 | 10/1986 | Wilkeson . |
| 4,865,482 | 9/1989 | Landingham . |

FOREIGN PATENT DOCUMENTS

| | | | |
|---|---|---|---|
| 1025878 | 1/1953 | France ............................... | 401/273 |
| 1105353 | 6/1955 | France . | |
| 1168555 | 9/1958 | France . | |
| 2422361 | 12/1979 | France . | |
| 3738084 | 11/1988 | Germany ......................... | 401/273 |
| 7807653 | 1/1980 | Netherlands . | |
| 342944 | 2/1931 | United Kingdom . | |
| 2096888 | 3/1982 | United Kingdom . | |
| 2159698 | 12/1985 | United Kingdom ............ | 401/273 |

OTHER PUBLICATIONS

R. C. Steele Wholesale Pet Equipment and Kennel Supplies catalog, Spring Preview 1994, published prior to May 2, 1994.

*Primary Examiner*—Steven A. Bratlie
*Attorney, Agent, or Firm*—Holland & Knight

[57] ABSTRACT

A fluid dispensing brush head includes bristles whose base portions engage apertures in a resilient member to create seal which is disrupted when the bristles are deflected as in use to selectively dispense a fluid. The bristles may be affixed to or form part of a unitary bristle carrier which, along with the resilient member, is removably secured to the body of the brush head so as to permit the brush head to be disassembled and thoroughly cleaned.

3 Claims, 3 Drawing Sheets

DISPENSING BRUSH HEAD

FIELD OF THE INVENTION

The invention relates to fluid dispensing. More particularly the invention relates to a brush head having bristles which engage apertures formed in a resilient member to selectively dispense a fluid when the bristles are deflected, such as by brushing action when the brush head is in use.

BACKGROUND OF THE INVENTION

Brush heads for dispensing fluid materials are useful in a variety of applications including but not limited to applying liquid and/or powdered materials to the hair and scalp in the grooming of persons or animals. Such materials may include for example insecticides, medicaments, cleansing agents, conditioners or the like. Various types of fluid dispensing brushes and/or combs intended for such use have been known in the prior art.

An early example of such a brush is shown in U.S. Pat. No. 621,917 to Hippisley. That brush includes hollow bristles communicating directly with a refillable fluid reservoir. The fluid to be dispensed flows from the reservoir and passes through the bristles before being discharged. Similar hollow bristles or teeth are also shown in U.S. Pat. No. 2,626,617 to Sullivan, French Patent No. 1,105,353 and U.S. Pat. No. 4,543,913 to Wilkeson. As the passageways through the bristles or comb teeth are necessarily quite small, they are difficult to form economically and are prone to clogging. Sanitation is also a problem since it is very difficult to thoroughly clean the entire fluid flow path in such devices.

Controlling the flow of the material being dispensed in a simple and economical manner has been another problem not satisfactorily addressed by the prior art. Hippisley '917 appears to provide no flow control at all other than the possibility of selectively orienting the brush for either no flow or flow under the influence of gravity. British Patent No. 342,944 to Crouch et al. discloses providing a valve between the fluid reservoir and the bristles. However, separate valve components like these entail additional components and assembly operations.

U.S. Pat. No. 4,543,913 to Wilkeson shows a liquid dispenser and grooming brush for animals in which only some of the teeth or bristles are formed with internal passages for carrying the fluid. Each of these has a free end provided with a "self-sealing slit" which opens to emit fluid only when downward force is applied to the dispenser, pressing the free ends in contact with the skin of the animal. This arrangement also suffers from a number of drawbacks. As noted above, arrangements involving small passages of significant length are difficult to clean and readily become clogged and unsanitary. While the aforementioned slits provide a degree of flow control, they are unfortunately located close to the tip of each bristle. As such, they are not only prone to clogging but are also subjected to substantial wear which may cause premature failure.

SUMMARY OF THE INVENTION

In view of the foregoing problems associated with the prior art, it is an object of the invention to provide a brush head for dispensing fluid material in which flow of the fluid is selectively initiated in response to the normal mechanical forces involved in using the brush head but which is not readily clogged and is easy to clean thoroughly.

It is a further object of the invention to provide a dispensing brush head which fulfills the foregoing objectives without necessity of locating a separate valve assembly in the flow path between fluid reservoir and bristle.

Yet another object of the invention is to provide a dispensing brush head which fulfills the above objectives while locating flow control components away from the free ends of the bristles to avoid undue wear.

These and other objects and advantages of the invention will be made clear to the person of ordinary skill in the art upon review of the detailed description below and the accompanying drawings wherein like reference numerals designate like items.

DETAILED DESCRIPTION OF A PREFERRED EMBODIMENT

Figure 1:
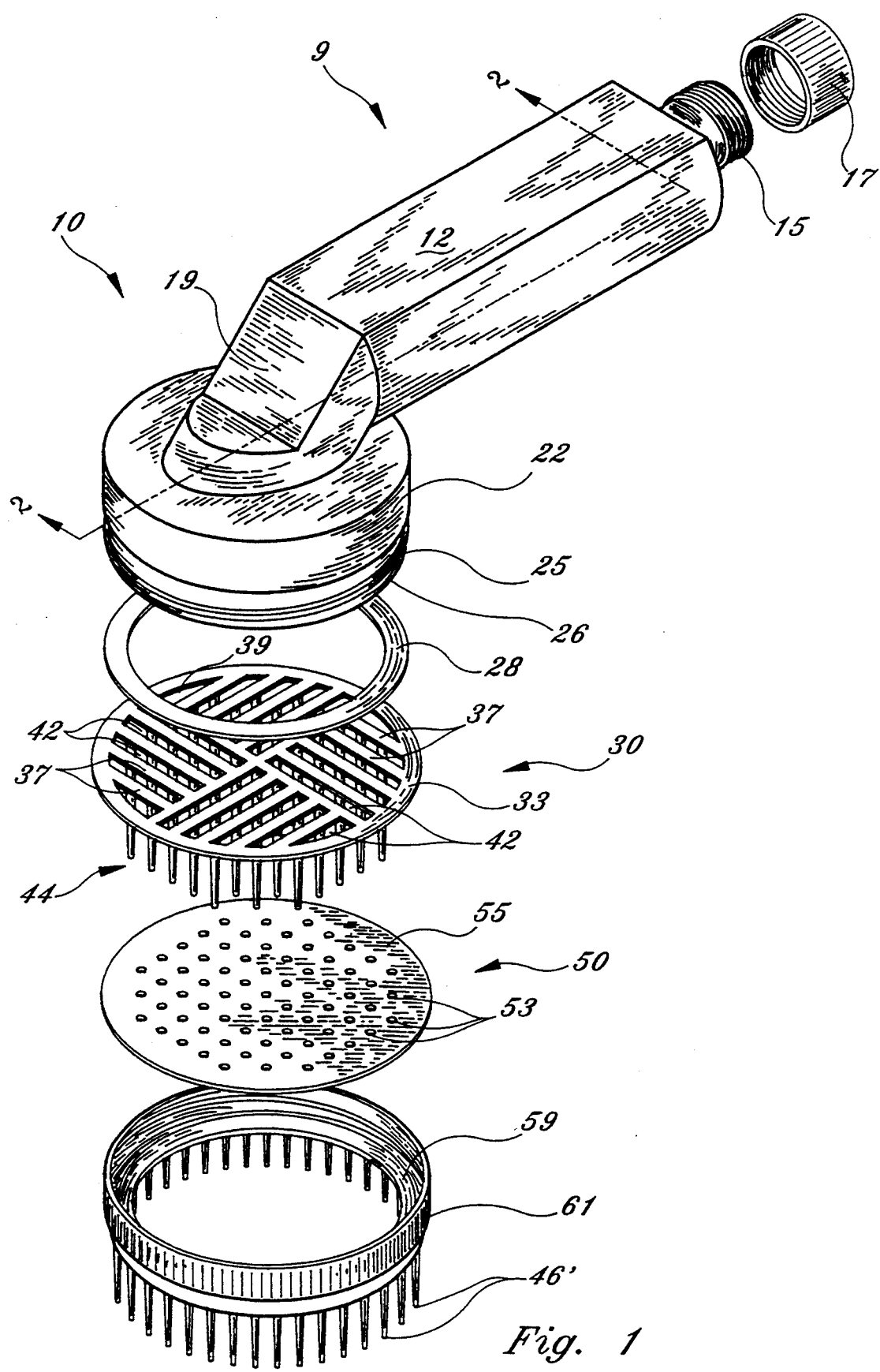
FIG. 1 is a perspective exploded view of a brush incorporating a preferred embodiment of the brush head of the present invention.

In FIG. 1 there is shown a brush 9 including a brush head 10 constructed according to the present invention. Brush 9 includes a hollow fluid reservoir 12 which serves conveniently as a brush handle and which includes a threaded inlet 15 for receiving a supply of fluid to be dispensed. Inlet 15 may be provided with a cap 17 as shown or connected to a hose or other conduit (not shown) coupled to a supply of the fluid. Cap 17 can be loosened slightly to provide venting to increase the rate of flow if desired. Reservoir 12 includes an angled section 19 terminating in brush head 10. In the preferred embodiment brush head 10 includes a cylindrical body 22 provided with external male threads 25 terminating near its rim 26. A flat ring-shaped gasket 28 having an outside diameter corresponding to that of the threaded portion of body 22 is optionally but preferably captured between body 22 and a bristle carrier 30.

Bristle carrier 30 may conveniently be injection molded or otherwise formed as a unitary assembly of polypropylene or other suitable material. In the preferred embodiment, bristle carrier 30 includes a peripheral ring 33 having an outside diameter corresponding to that of gasket 28. A web of mutually spaced bristle supports 37 are connected to ring 33 at its inner diametrical surface 39. The separations between adjacent ones of bristle supports 37 define openings 42 through which the fluid being dispensed may pass. Each bristle support 37 carries an array 44 of tapered bristles 46. In the preferred embodiment, each bristle 46 generally takes the form of an elongated cone of circular cross section although other shapes may be used if desired. While bristles 46 are preferably flexible and capable of deforming somewhat under the forces expected to be encountered in use, bristles 46 and/or their respective bristle supports 37 should be resilient enough so that at least the base portion of each bristle 46 lying adjacent bristle supports 37 returns substantially to its original position when brush head 10 is not subjected to external forces such as those encountered during use when the bristles 46 of brush head 10 may be deflected as they are drawn through hair or other material being brushed or are forced into contact with a surface being brushed.

In accordance with the invention, brush head 10 includes a resilient member 50 in the form of a membrane or plate molded, perforated or otherwise formed to include an array of apertures 53. These apertures are arranged in a pattern corresponding to that of the array 44 of bristles 46 extending from bristle support 37. Member 50 is of a size and overall shape corresponding to those of gasket 28 and bristle support 37 and preferably includes an uninterrupted perimeter region 55. Perimeter region 55 is capable of forming a fluid-tight seal between the ring 33 of bristle support 37 and a radially inwardly protruding rim 59 of a releasable collar 61.

To facilitate rapid and easy disassembly and thorough cleaning of the various components of brush head 10, collar 61 is conveniently provided with female threads 64 engageable with the male threads 25 carried by body 22. Alternatively, a bayonet locking arrangement, a releasable snap fit or other releasable fastening mechanism be provided in lieu of threads 25 and 64 in order to releasably secure collar 61 to body 22. If desired, collar 61 may also be provided about its perimeter with additional bristles 46'. Bristles 46' may be of the same or a different material, shape, mutual spacing and/or length as the bristles 46 making up bristle array 44 according to the demands of a particular application and the preferences of the user.

Figure 2:
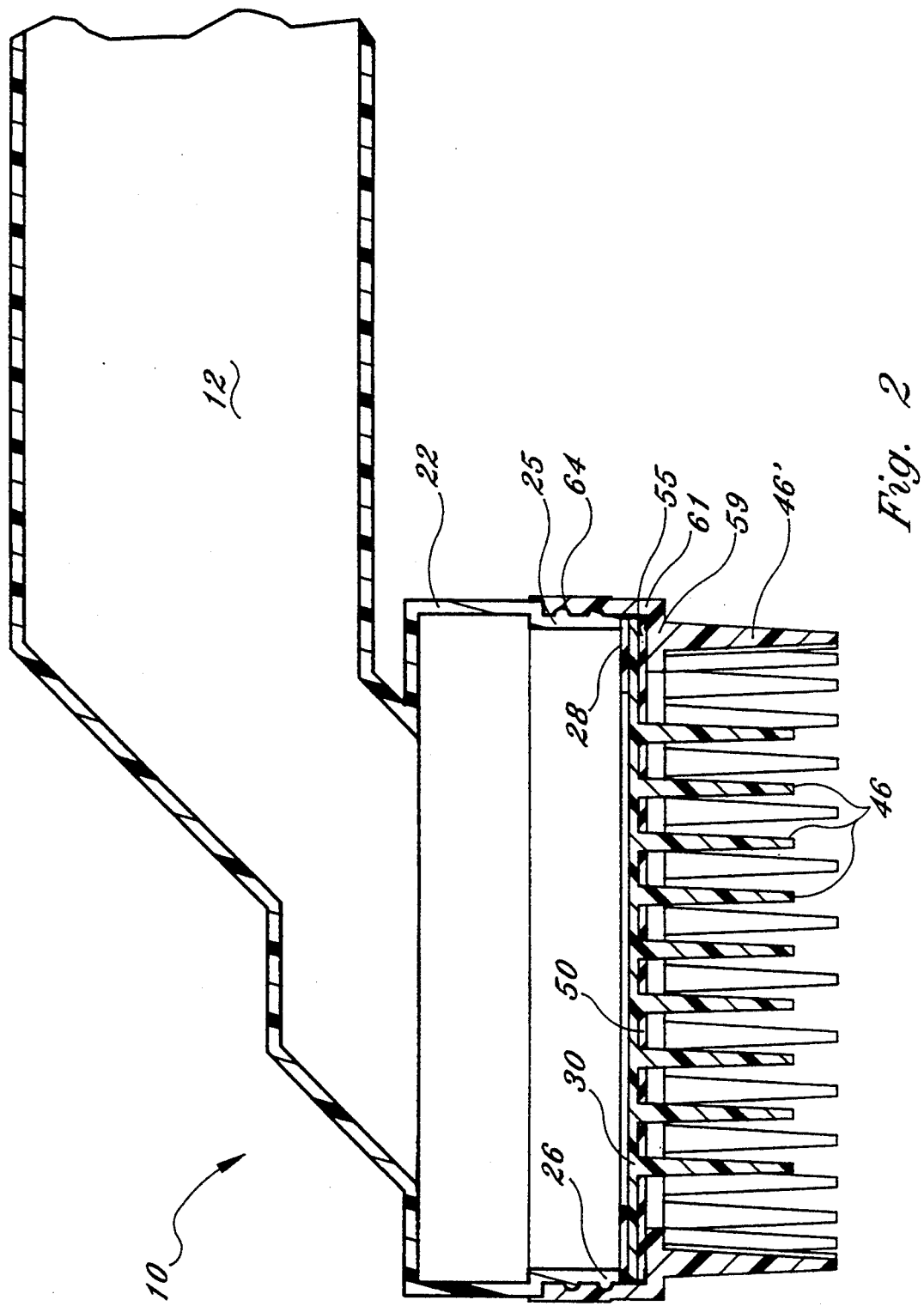
FIG. 2 is a partial side-sectional view taken along line 2—2 of FIG. 1 showing the brush head in its normal assembled configuration.

Referring additionally now to FIG. 2, the components of brush head 10 are shown in their normal assembled configuration wherein option gasket 28 as well as bristle carrier 30 and member 50 are securely captured between body 22 and collar 61. The combined thickness of gasket 28, ring 33 and the perimeter region 55 of member 50 are selected such that when collar 61 is fully engaged with body 22, gasket 28, ring 33 and perimeter region 55 are sufficiently compressed between the rim 26 of body 22 and the radially inwardly projecting rim 59 of collar 61 to form a fluid-tight seal about the circumference of rim 59.

In their normal, undeflected positions as shown in FIG. 2, the base portion of each bristle 46 is sealingly engaged by the peripheral surface of each aligned aperture 53 through which that bristle 46 passes when brush head 10 is assembled as shown. This may conveniently be achieved by forming member 50 of a synthetic rubber or other elastomeric material and by sizing the base portions of bristles 46 to be slightly larger than the apertures 53 which receive them. Thus, when bristles 46 are in their normal, undeflected positions as shown in FIG. 2, apertures 53 are sealed by bristles 46 so that fluid from reservoir 12 remains within reservoir 12 and/or within the interior confines of body 22 and is prevented from being dispensed from brush head 10.

Figure 3:
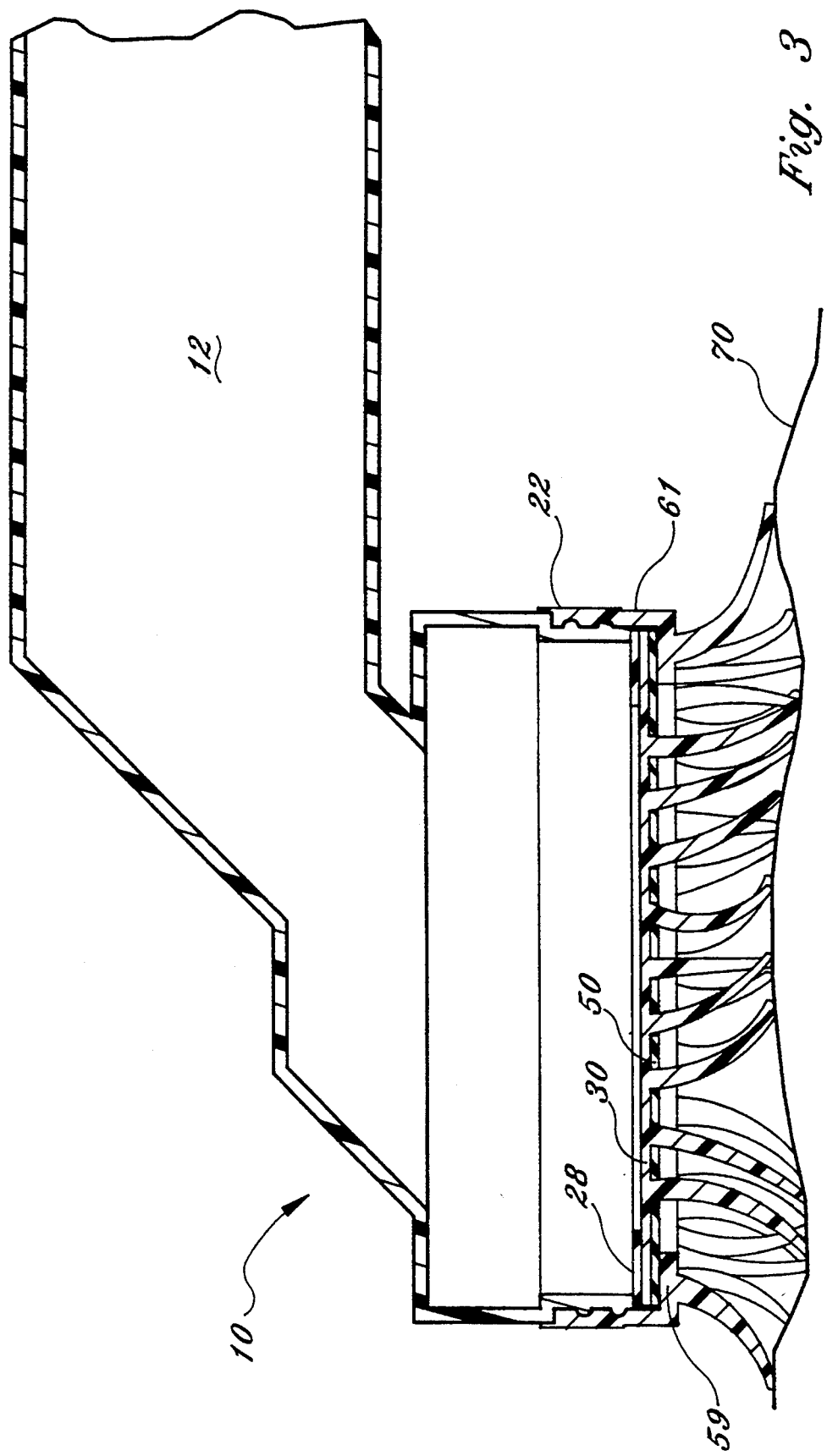
FIG. 3 is a partial side sectional view similar to that of FIG. 2 except showing the brush head with its bristles deflected as in use to permit fluid to be dispensed.

In use as illustrated in FIG. 3, bristles 46 are deflected as they engage hair and/or a surface 70 being brushed. Bristles 46 are sufficiently stiff that when so deflected, they cause member 50 to elastically deform in the vicinity of apertures 53. As a consequence, the seal previously existing between the base portions of bristles 46 and boundaries of apertures 53 is momentarily disrupted as to permit fluid to be dispensed from brush head 10. In cases where the fluid being dispensed is a liquid, the surface tension of liquid will ordinarily cause the liquid to flow along the outside surface of bristles 46 for distribution onto the hair and/or scalp or other surface being brushed. Powders or other fluid materials will be dispensed from apertures 53 near the base of bristles 46, thus providing bristles 46 with a maximum opportunity to work the powder into the hair or other material being brushed before any excess powder can be carried off by ambient air currents and be wasted. When the externally applied brushing force action on bristles 46 is momentarily removed or significantly reduced, the compliant character of member 50 as well as that of bristles 46 and/or their respective bristle supports 37 restores the sealing relationship between the base portions of bristles 46 and the boundaries of apertures 53 in order to terminate the dispensing of fluid from brush head 10 until bristles 46 are subsequently deflected to a degree sufficient to permit flow to resume.

In view of the foregoing, it can be appreciated that flow of the fluid being dispensed is selectively initiated and terminated in response to the mechanical forces encountered while brush head 10 is in use. It can further be appreciated that since bristles 46 themselves cooperate with apertures 53 to control the flow of fluid, it is not necessary to provide a separate valve assembly in the fluid flow path between reservoir 12 and bristles 46. Because the fluid is discharged from brush head 10 near the base of bristles 46 rather than near their tips, clogging is less likely. Moreover, the compliant nature of the seal between apertures 53 and bristles 46 and the mechanical movement between those components which occurs when brush head 10 is in use makes foreign matter less likely to accumulate there. A further advantage of the brush head of the invention is that, as illustrated in FIG. 1 it can readily be disassembled to permit thorough cleaning and sanitizing of all components.

Brush head 10 as described above constitutes a preferred embodiment of the invention, according to the best mode presently contemplated by the inventors of making and carrying out the invention. However, it is to be understood that the invention is not limited to the particulars of the embodiment which has been described. In light of the present disclosure, various alternative embodiments will be apparent to those skilled in the art. Accordingly, it is to be recognized that changes can be made without departing from the scope of the invention as particularly pointed out and distinctly claimed in the appended claims as interpreted literally or expanded to include all legal equivalents.

What is claimed is:

1. A fluid dispensing brush head, comprising:
   a body having an internal passage for the fluid;
   a bristle carrier affixable to said body, said bristle carrier having an array of bristles projecting therefrom, and each of said bristles having a base portion;
   a resilient member having a plurality of apertures arranged in a pattern alignable with said array, said apertures being of a size and shape suitable to form a fluid seal about said base portions of said bristles when said bristles are received through corresponding ones of said apertures, said member being yieldable in response to deflection of said bristles when said brush head is in use so as to disrupt said seal and permit fluid to be dispensed from the brush head.

2. The brush head of claim 1 further, comprising:
   a collar releasably securable to said body, said collar serving to hold said resilient member and said bristle carrier between said collar and said body when said collar is secured to said body.

3. The brush head of claim 2 wherein said body, said bristle carrier, said resilient member and said collar comprise separate components mutually separable from one another when said collar is released from said body whereby cleaning of said brush head is facilitated.

* * * * *

UNITED STATES PATENT AND TRADEMARK OFFICE
CERTIFICATE OF CORRECTION

PATENT NO. : 5,443,321
DATED : August 22, 1995
INVENTOR(S) : Michael J. Dolan, William R. Dolan It is certified that error appears in the above-indentified patent and that said Letters Patent is hereby corrected as shown below:

On the page, insert item [75], to correct the address.

Michael J. Dolan
    5006 S.W. 90th Way
    Cooper City, Fla. 33328

Signed and Sealed this

Ninth Day of January, 1996

*Attest:*

BRUCE LEHMAN

*Attesting Officer*     Commissioner of Patents and Trademarks